Aug. 4, 1931.  M. B. BARNES  1,817,339
MOLD
Filed June 25, 1928
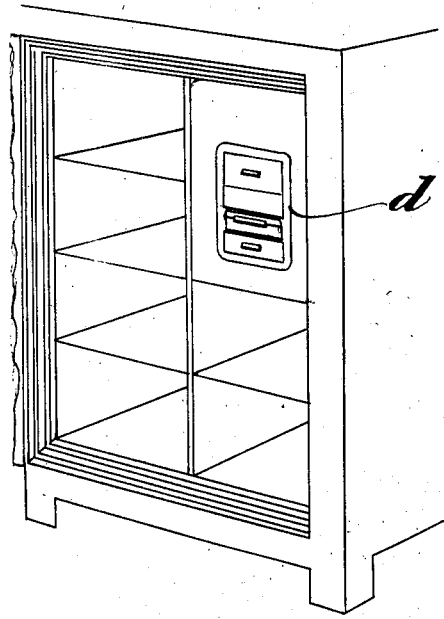
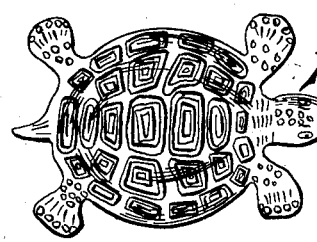
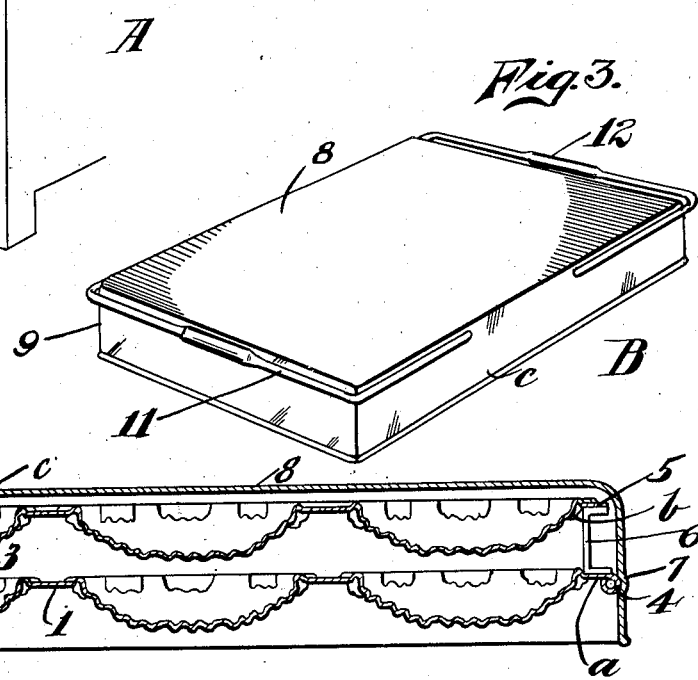
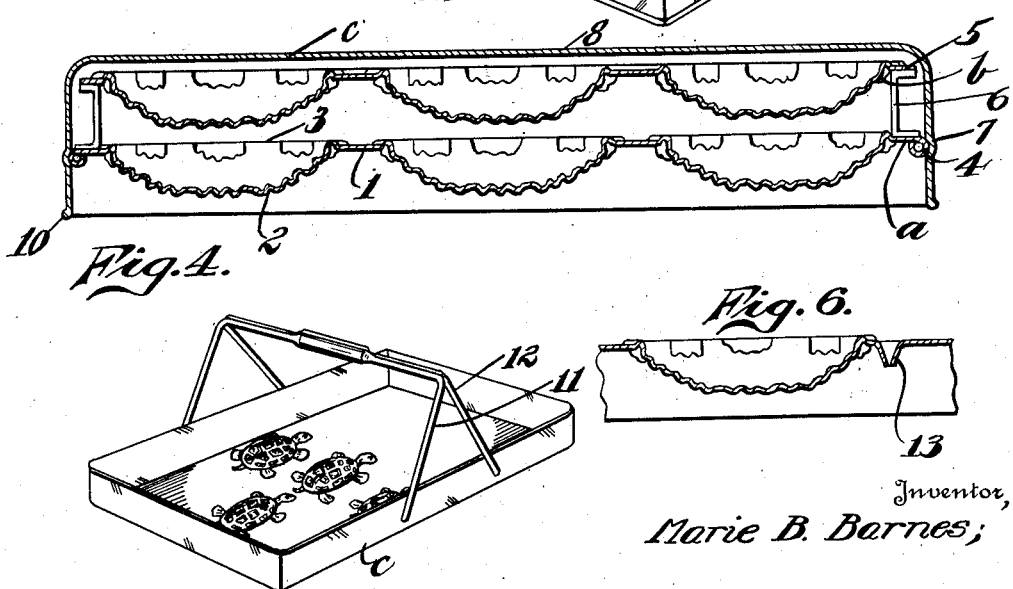
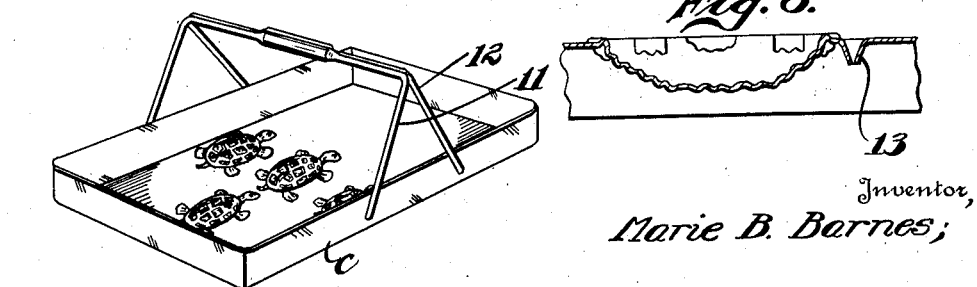
Inventor,
Marie B. Barnes;
By Blakeslee+Brown
Attorney Patented Aug. 4, 1931

1,817,339

UNITED STATES PATENT OFFICE

MARIE B. BARNES, OF LOS ANGELES, CALIFORNIA

MOLD

Application filed June 25, 1928. Serial No. 288,117.

This invention relates to means for forming frozen articles in various shapes.

The invention contemplates in its broadest interpretation a mold formed to receive some liquid which is to be frozen to simulate a turtle, a fish, or any other form or shape desired. The molded articles are used for icing, decorating, and flavoring drinks, salads, and desserts.

The invention has for an object the provision of a suitable device which is inexpensive of manufacture, easy to handle, and generally superior for the purpose intended.

With the above and other objects in view, the invention consists in the novel and useful provision, formation, construction, association, and relative arrangement of parts, members and features, all as shown in certain embodiments in the accompanying drawings, described generally, and more particularly pointed out in the claims.

In the drawings:

Figure 1 is a fragmentary perspective view of a refrigerator embodying the invention, Figure 2 is a plan view of a frozen article, Figure 3 is a perspective view of the device used in practicing the invention, Figure 4 is a longitudinal sectional view of the invention, Figure 5 is a perspective view of the cover used in the invention, and Figure 6 is a fragmentary sectional view of a modified form of the invention.

Referring now with particularity to the drawings, it may be said in preface that it is ordinary practice with such installations as the "frigidaire" to provide a compartment adapted to receive a partitioned tray, which tray is filled with some liquid, such as water, the water being frozen into cubes. The present invention contemplates the provision of a tray adapted to fit into some device such as the "frigidaire", and in which the liquid frozen will assume various shapes and forms other than a plain cube. For instance, I have shown in Figure 2, in plan, a turtle. It is intended that the bottom surface of the turtle should be comparatively flat, while the top surface would be curved and have the general appearance of a turtle. It is within the scope of the invention to color this turtle so that there might be a green appearance to the frozen article. It is thus possible to provide frozen articles which are attractive in appearance.

The so-called iceless refrigerator shown in Figure 1 is designated as A, and a compartment therein, which ordinarily receives a tray formed with partitions so that ice cubes may be formed, by $d$. The details of construction of the refrigerator will not be gone into as it is common practice to provide the compartment $d$ in almost all automatic refrigerators on the market today.

The embodiment of the invention shown in Figures 3, 4 and 5 is designated as an entirety by B, and the same includes one or more containers $a$ and $b$, and a cover $c$ therefor. The container $a$ includes a plate 1 provided with one or more molds 2 which are depressed downwardly from the surface of the plate 1 and with the top margin 3 of said molds slightly elevated above the normal top surface of the plate 1. If more than one mold is used, said molds are spaced apart. The rim of said plate is provided with a bead 4. The container $b$ is similarly constructed to the container $a$ with the exception that the rim thereof is not beaded but is left with a substantial marginal flat portion 5. The two containers are adapted to be separated by a member 6 which, in the present instance, is channel in cross section and may be placed at ends of said containers. The cover $c$ is adapted to enclose both containers and said cover is formed with a curved channel 7 which may be provided at ends of said container or throughout the rim of said container. The beaded part 4 is adapted to be received within the channel and for holding the container to the cover. The cover otherwise is conventional in form, including the usual flat plate 8 with sides 9 and with the rim of the sides slightly enlarged, as shown at 10. A pair of handles 11 and 12 are secured to the cover whereby the cover may be lifted from the container or containers. When the handles are in the position shown in Figure 5, the cover may act as a tray. The molds may assume any configuration desired other than that shown, and when water, salad, fruit juices, gingerale, or any other fluid or semi-solid material is placed within the molds, the same may be frozen in the manner indicated by placing the container or containers within the cover in the compartment $a$ of the refrigerator A.

In Figure 6, I have shown a slight modification of the invention wherein that portion of the plate 1 which would normally separate each mold, where there was more than one mold, is struck downwardly to form one or more members 13, substantially hollow frusto conical in cross section.

The operation of the device is as follows:

If two containers are used, they may be separated by the means 6. After the material to be frozen is placed within the mold, the same is put into the compartment $a$ for freezing. Upon withdrawal from the compartment $a$ after the material has been frozen, the cover may be removed and upon turning the containers upside down, the molded articles may be allowed to drop into the cover which now acts as a tray. In case the frozen articles should stay within the mold, the same may be released either by tapping or by pouring tepid water over the outside surface of the mold. If a container of the form shown in Figure 6 is used, the member 13 allows any excess of water or other material from the mold to pass therethrough so that there would be no connecting portion between the molds. This feature, however, may not be necessary, as it will be observed that the top portion 3 of each mold is slightly elevated above the normal plane surface of the plate 1. Any number of containers may be placed within a cover depending upon the depth of the cover by separating said containers by the means 6.

The resultant frozen article which has been molded to shape will simulate some animate object and may be placed upon icing, cake, in desserts such as a gelatin dessert, the animate object being visible therethrough, the article may be placed in punch, and in fact said animate object may be flavored so that a flavoring is given to the drink. The uses of the invention are numerous and will present various decorative novelties to a user. I do not wish to confine my invention to a method for accomplishing an object, but I contemplate as well the resultant molded article as a part of my invention.

It is obvious that various changes and modifications and variations may be made in practicing the invention in departure from the particular showing of the drawings without departing from the true spirit thereof.

Having thus disclosed my invention, what I claim as new and desire to secure by Letters Patent is:

1. As a new article of manufacture, a plate provided with skirting along its marginal edge, a plurality of mold portions in said plate, said mold portions simulating animal life, and a cover adapted to enclose said mold portions.

2. As a new article of manufacture, a plate provided with mold portions, the rim of said mold portions being above the plane surface of said plate, and down-struck conical portions between the mold portions, said conical portions being provided with openings.

In testimony whereof, I have signed my name to this specification at Los Angeles, California, this 11th day of June, 1928.

MARIE B. BARNES.